United States Patent [19]

Speca

[11] Patent Number: 4,711,865

[45] Date of Patent: Dec. 8, 1987

[54] OLEFIN POLYMERIZATION CATALYSTS, PRODUCTION AND USE

[75] Inventor: Anthony N. Speca, Kingwood, Tex.

[73] Assignee: Exxon Chemical Patents Inc., Linden, N.J.

[21] Appl. No.: 944,306

[22] Filed: Dec. 18, 1986

[51] Int. Cl.$^4$ ............................ C08F 4/62; C08F 4/64; C08F 4/68

[52] U.S. Cl. .................................. 502/116; 502/112; 502/113; 502/115; 502/117; 502/119; 502/120; 526/128; 526/129; 526/124; 526/137

[58] Field of Search ............... 502/112, 113, 115, 116, 502/117, 119, 120

[56] References Cited

U.S. PATENT DOCUMENTS

| | | | |
|---|---|---|---|
| 3,135,809 | 6/1964 | Bosmajian | 502/103 X |
| 4,564,606 | 1/1986 | Best | 502/117 |
| 4,565,797 | 1/1986 | Etherton et al. | 502/116 |
| 4,618,596 | 10/1986 | Agapiou et al. | 502/116 |
| 4,639,428 | 1/1987 | Best | 502/115 |

*Primary Examiner*—Patrick P. Garvin
*Attorney, Agent, or Firm*—John F. Hunt

[57] ABSTRACT

A catalyst for the polymerization of olefins, said catalyst comprising a transition metal containing support catalyst component and an aluminum alkyl cocatalyst, said transition metal containing catalyst component obtained by contacting an inorganic metal oxide with an organomagnesium compound and an alcohol, drying the contact product, treating the dried contact product with an acyl halide, a halogen such as chlorine, a transition metal halide such as titanium tetrachloride, and in the last step treating the titanium-containing component with an organoaluminum compound such as tri-n-hexylaluminum.

3 Claims, No Drawings

OLEFIN POLYMERIZATION CATALYSTS, PRODUCTION AND USE

BACKGROUND OF THE INVENTION

1. Field of the Invention

This invention relates to novel catalysts for the polymerization of olefins. This invention especially relates to the use of an intermediate drying step for the production of improved catalysts. These improved catalysts are to be employed with cocatalyst for use in the polymerization of olefins to polyolefins such as polyethylene, polypropylene and the like, or copolymers such as ethylene copolymers with other alpha-olefins and diolefins. The intermediate drying step imparts unusually high activity and improved hydrogen response to the catalyst and the polymer product obtained has a desirable bulk density. The improved catalysts are especially useful for the production of linear polyethylenes such as high density and linear low density polyethylene. The polymer product obtained evidences an important balance of polymer properties, for example, the catalyst system obtains a polymer with a narrow molecular weight distribution and an improved balance in polymer product machine direction tear strength and transverse direction tear strength. As a result, the film blown from resin produced from the catalyst manifests an overall high strength.

The improved catalyst comprises a solid reaction product obtained by contacting a solid, particulate, porous support material such as, for example, silica, alumina, magnesia or mixtures thereof, for example, silica-alumina, with an organometallic composition treated with an alcohol, drying to a free flowing solid then contacting the solid in stages with an acyl halide, a transition metal compound, a halogen containing compound, halogen or interhalogen and prereducing the solid in the presence of an organoaluminum compound. The intermediate drying step provides an improved catalyst component, which when used with an aluminum alkyl cocatalyst, produces the improved catalyst system of this invention which can be usefully employed for the polymerization of olefins.

The catalyst system can be employed in slurry, single-phase melt, solution or gas-phase polymerization processes and is particularly effective for the gas phase production of linear polyethylenes such as high density polyethylene and linear low density polyethylene.

2. Description of the Prior Art

Recently, interest has arisen in the use of magnesium-titanium complex catalyst components for the polymerization of olefins. For example, European patent application No. 27733, published Apr. 29, 1981 discloses a catalyst component obtained by reducing a transition metal compound with an excess of organomagnesium compound in the presence of a support such as silica and thereafter deactivating the excess organomagnesium compound with certain deactivators including hydrogen chloride.

U.S. Pat. No. 4,136,058 discloses a catalyst component comprising an organomagnesium compound and a transition metal halide compound, which catalyst component is thereafter deactivated with a deactivating agent such as hydrogen chloride. This patent does not teach the use of support material such as silica, but otherwise the disclosure is similar to the above-discussed European patent application.

U.S. Pat. No. 4,250,288 discloses a catalyst which is the reaction product of a transition metal compound, an organomagnesium component, and an active non-metallic halide such as HCl and organic halides containing a labile halogen. The catalyst reaction product also contains some aluminum alkyls.

Catalyst components comprising the reaction product of an aluminum alkyl-magnesium alkyl complex plus titanium halide are disclosed in U.S. Pat. Nos. 4,004,071 and 4,276,191.

U.S. Pat. Nos. 4,173,547 and 4,263,171, respectively disclose a catalyst component comprising silica, an aluminum-type titanium trichloride and dibutyl magnesium and a catalyst component comprising a magnesium alkyl-aluminum alkyl complex plus titanium halide on a silica support.

The use of chlorine gas in polymerization processes is taught in U.S. Pat. No. 4,267,292 wherein it is disclosed that chlorine gas is to be added to the polymerization reactor after polymerization has been initiated in the presence of a Ziegler catalyst. U.S. Pat. No. 4,248,735 teaches subjecting a silica support to a treatment with bromine or iodine and thereafter incorporating a chromium compound onto the support. U.S. Pat. No. 3,513,150 discloses the treatment of gamma alumina plus titanium tetrachloride with a gaseous chlorinating agent and employing said treated material in combination with a cocatalyst for the polymerization of ethylene.

European patent application 32,308 discloses polymerizing ethylene in the presence of a catalyst system comprising an organic metal compound and a titanium-containing material which is obtained by reacting together an inert particulate material, an organic magnesium compound, a titanium compound and a halogen containing compound such as $SiCl_4$, $PCl_3$, $BCl_3$, $Cl_2$ and the like.

Each of U.S. Pat. Nos. 4,402,861, 4,378,304, 4,388,220, 4,301,029 and 4,385,161 disclose supported catalyst systems comprising an oxide support such as silica, an organomagnesium compound, a transition metal compound and one or more catalyst component modifiers. These patents do not disclose the catalyst of this invention.

In British No. 2,101,610 silica is treated with a magnesium alkyl, an alcohol, benzoyl chloride and $TiCl_4$. In each of Japanese Kokai Nos. 56-098206 and 57-070107 acyl halides are employed during the preparation of titanium supported catalysts.

The catalyst systems comprising magnesium alkyls and titanium compounds, although generally useful for the polymerization of olefins such as ethylene and other 1-olefins, do not show excellent responsiveness to hydrogen during the polymerization reaction for the control of molecular weight, do not readily incorporate comonomers such as butene-1 for the production of ethylene copolymers, do not show an extremely high catalytic activity and obtain polymer product whose film properties are unbalanced under anisotropic conditions.

In U.S. Pat. No. 4,451,574 issued May 29, 1984, a catalyst system obtained by treating an inert particulate support, such as silica, with an organometallic compound, a titanium halide and a halogen gas is disclosed. Although the catalyst obtains very high activities, there is a need for improving the film properties of polymer product obtained by polymerizing olefins in the presence of the catalyst and to improve the bulk density of polymer product In Application Ser. No. 638,167 filed Aug. 6, 1984 and now U.S. Pat. No. 4,564,606 there is disclosed a transition metal supported catalyst component obtained by contacting an inert solid support with (a) the reaction product of a dialkyl magnesium compound and an alcohol, (b) an acyl halide, (c) $TiCl_4$, and (d) $Cl_2$. In application Ser. No. 637,641 filed Aug. 3, 1984 and now U.S. Pat. No. 4,565,797 there is disclosed a transition metal supported catalyst component obtained by contacting an inert solid support with (a) the reaction product of a dialkyl magnesium compound and an oxygen-containing compound, (b) a transition metal halide such as $TiCl_4$, (c) $Cl_2$ and treating the resultant solid with an organometallic compound of a Group IIa, IIb or IIIa metal. Neither application discloses the use of an intermediate drying step. Although these catalysts obtain high activities and improved film properties, there is a need for improving both activity and response to hydrogen.

In accordance with this invention improved catalysts have been found which have very high catalytic activities and excellent hydrogen responsiveness for the control of molecular weight, excellent comonomer response and obtain polymer product with greatly improved film properties. The resins exhibit excellent melt strength at low extrusion power consumption, resulting in excellent bubble stability in blown film production at high extrusion rates. The invention is an improvement over pending applications Ser. No. 638,167 U.S. Pat. No. 4,564,606) and Ser. No. 637,641 (U.S. Pat. No. 4,565,797) in that the catalysts of this invention unexpectedly obtain an improvement in catalytic activity and hydrogen response providing polymers with reduced ash content and a broad range of molecular weights. These unexpected improvements are obtained by the use of an intermediate drying step during the catalyst preparation.

The new catalyst components of this invention are obtained by contacting an oxide support with an organometallic composition treated with an alcohol, drying to a free flowing solid then contacting the solid in stages with an acyl halide, a transition metal compound, a halogen or interhalogen compound, and an organometallic compound of a Group IIa, IIb or IIIa metal such as, for example, an aluminum alkyl. The catalyst system comprising the transition metal-containing catalyst component and an organoaluminum cocatalyst is advantageously employed in a gas phase ethylene polymerization process since there is a decrease in reactor fouling as generally compared with catalytic prior art ethylene gas phase polymerization processes thereby resulting in less frequent reactor shut downs for cleaning purposes.

SUMMARY OF THE INVENTION

In accordance with the objectives of this invention there is provided a transition metal-containing catalyst component for the polymerization of alpha-olefins comprising a solid reaction product obtained by treating a solid support material in an inert solvent with (A) an organometallic compound of a Group IIa, IIb or IIIa metal of the Periodic Table wherein all the metal valencies are satisfied with a hydrocarbon or substituted hydrocarbon group, (B) an oxygen-containing compound selected from ketones, aldehydes, alcohols, siloxanes or mixtures thereof, followed by drying the slurry to yield a solid support material which is then treated in an inert solvent with (C) an acyl halide, (D) at least one transition metal compound of a Group IVb, Vb, VIb or VIII metal of the Periodic Table, (E) $Cl_2$, $Br_2$ or an interhalogen, and (F) treating the transition metal-containing product with an organometallic compound of a Group IIa, IIb, or IIIa metal.

The solid transition metal-containing catalyst component when employed in combination with a cocatalyst such as an alkyl aluminum cocatalyst provides a catalyst system which demonstrates a number of unique properties that are of great importance in olefin polymerization technology such as, for example, extremely high catalytic activity, improved bulk density, improved comonomer response, increased polymer yield, and reduced reactor fouling. A particular advantage of the instant invention is the ability to control the molecular weight during the polymerization reaction as a result of the improved responsiveness to hydrogen.

In a preferred embodiment of the invention the (A) organometallic compound of the catalyst precursor composition is a dihydrocarbyl magnesium compound represented by $R^1MgR^2$ wherein $R^1$ and $R^2$ which can be the same or different are selected from alkyl groups, aryl groups, cycloalkyl groups, aralkyl groups, alkadienyl groups or alkenyl groups having from 1 to 20 carbon atoms, the (B) oxygen-containing compounds are selected from alcohols and ketones represented by the formula $R^3OH$ and $R^4COR^5$ wherein $R^3$ and each of $R^4$ and $R^5$ which may be the same or different can be an alkyl group, aryl group, cycloalky group, aralkyl group, alkadienyl group or alkenyl group having from 1 to 20 carbon atoms, the (C) acyl halide is represented by the formula $R^6COX$ wherein $R^6$ can be a $C_1$–$C_{20}$ alkyl group, cycloalkyl group or aryl group and X is halogen. The (D) transition metal compound is preferably a transition metal compound or combination of transition metal compounds represented by the formulas $MX''_{4-q}(OR^7)_q$, $MX''_{4-q}R^8_q$, $VO(OR^7)_3$ and $VOX''_3$ wherein M is a transition metal of Groups IVb, Vb, VIb, and VIII and preferably titanium, vanadium or zirconium, $R^7$ is an alkyl group, aryl group, aralkyl group or substituted aralkyl group having from 1 to 20 carbon atoms and 1,3-cyclopentadienyl, X'' is halogen and q is zero or a number less than or equal to 4, and $R^8$ is an alkyl group, aryl group or aralkyl group having from 1–20 carbon atoms or a 1,3-cyclopentadienyl, the (E) halogen is $Cl_2$ and the (F) organometallic compound is an aluminum alkyl represented by $R^9_nAlX'_{3-n}$ wherein X' is a halogen, or hydride and $R^9$ is a hydrocarbon group selected from alkyl group, aryl group, cycloalkyl group, aralkyl group, alkadienyl group or alkenyl group having from 1 to 20 carbon atoms and $1 <= n <= 3$.

All references to the Periodic Table are to the Periodic Table of the Elements printed on page B-3 of the 56th Edition of Handbook of Chemistry and Physics. CRC Press (1975).

The intermediate drying can be accomplished for example, by removing the supernatant liquid in vacuo or under a sweep of dry, inert gas, such as nitrogen or argon. The intermediate drying temperature covers a broad range but preferably is high enough to efficiently remove the hydrocarbon diluent. The resulting product is a dry, free flowing solid wherein the organometallic compound and the oxygen-containing compound are reacted on the inert solid support material.

In a second embodiment of this invention there is provided a catalyst system comprising the transition metal-containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional Ziegler catalysts, it is generally not necessary to deash polymer product since polymer product will generally contain lower amounts of catalyst residues than polymer product produced in the presence of conventional catalysts.

The catalyst system can be employed in a gas phase process, single phase melt process, solvent process or slurry process. The catalyst system is usefully employed in the homopolymerization of ethylene and alpha-olefins having from 3 or more carbon atoms, paricularly alpha-olefins having from 3 to 8 carbon atoms, and co-polymerization of ethylene with other 1-olefins or diolefins having from 2 to 20 carbon atoms, such as propylene, butene, pentene, hexene, butadiene, 1,4-pentadiene and the like, so as to form ethylene copolymers of low and medium densities. The supported catalyst system is particularly useful for the polymerization of ethylene and copolymerization of ethylene with other alpha-olefins in gas phase processes.

DESCRIPTION OF THE PREFERRED EMBODIMENTS

Briefly, the catalyst components of the present invention comprise the solid reaction product obtained by contacting in a hydrocarbon solvent a solid support material with (A) an organometallic compound of a Group IIa, IIb and III of the Periodic Table, (B) an oxygen-containing compound, followed by drying to a free flowing solid which solid is treated in steps with (C) an acyl halide, (D) at least one transition metal compound, (E) a halogen or interhalogen compound and treated with (F) an organometallic compound of a Group IIa, IIb, IIIa metal.

The organometallic composition and the oxygen-containing compound can be added in any order to each other or to the solid support material. It is specially preferred to contact the organometallic and oxygen containing compounds in an inert diluent prior to addition to the solid support material.

The remaining catalyst component forming ingredients can be added in any order to the dried support material (with the exception of (F) which must be last) in preparing the transition metal-containing catalyst component.

The transition metal-containing catalyst component especially preferred is prepared by first treating the inert solid support with the reaction product of the organometallic composition and the oxygen-containing compound, followed by drying to a free flowing solid which is treated with the acyl halide, with the at least one transition metal compound, and chlorine and prereducing with the organometallic compound of a Group IIIa metal.

Typically, the support can be any of the solid particulate porous supports such as a Group IIa, IIIa, IVa or IVb metal oxide in finely divided form.

Suitable inorganic oxide materials which are desirably employed in accordance with this invention include silica, alumina, and silica-alumina and mixtures thereof. Silica is especially preferred. Other inorganic oxides that may be employed either alone or in combination with silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the organometallic composition first added to the reaction solvent. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, such as trimethylchlorisilane, dimethyldichlorosilane, silylamines, such as hexamethyldisilazane and dimethylaminotrimethylsilane and the like. The chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the inert hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ or $R^2$ can contain between 1 and 20 carbon atoms and preferably from 1 to about 10 carbon atoms. Illustrative but nonlimiting examples of magnesium compounds which may be suitably employed in accordance with the invention are dialkylmagnesiums such as diethylmagnesium, dipropylmagnesium, di-isopropylmagnesium, di-n-butylmagnesium, di-isobutylmagnesium, diamylmagnesium, di-n-octylmagnesium, di-n-hexylmagnesium, di-n-decylmagnesium, and di-n-dodecylmagnesium; dicycloalkylmagnesiums, such as dicyclohexylmagnesium; diarylmagnesiums such as dibenzylmagnesium, ditolylmagnesium and dixylylmagnesium and the like.

Preferably the organomagnesium compounds will have from 1 to 6 carbon atoms and most preferably $R^1$ and $R^2$ are different. Illustrative examples of the preferred magnesium compounds are ethyl-n-propylmagnesium, ethyl-n-butylmagnesium, amyl-n-hexylmagnesium, n-butyl-s-butylmagnesium, n-butyl-n-octylmagnesium, and the like. Mixtures of hydrocarbyl magnesium compounds may be suitably employed such as for example di-n-butylmagnesium and ethyl-n-butyl-magnesium.

The magnesium hydrocarbyl compounds are generally obtained from commercial sources as mixtures of the magnesium hydrocarbon compounds with a minor amount of aluminum hydrocarbyl compound. The minor amount of aluminum hydrocarbyl is present in order to facilitate solublization and/or reduce the viscosity of the organomagnesium compound in hydrocarbon solvent.

The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylene, etc.

The organomagnesium complex with a minor amount of aluminum alkyl can be represented by the formula $(R^1MgR^2)_p(R^{10}{}_3Al)_s$ wherein $R^1$ and $R^2$ are defined as above, $R^{10}$ is defined as Rhu 1 and $R^2$ and p is greater than 0. The ratio of s/s+p is from 0 to 1, preferably from 0 to about 0.7 and most desirably from about 0 to 0.1.

Illustrative examples of the organomagnesium-organoaluminum complexes are
[(n—(C$_4$H$_9$)(C$_2$H$_5$)Mg][(C$_2$H$_5$)$_3$Al]$_{0.02}$,
[(n—C$_4$H$_9$)$_2$Mg][(C$_2$H$_5$)$_3$Al]$_{0.013}$,
[(n—C$_4$H$_9$)$_2$Mg][(C$_2$H$_5$)$_3$Al]$_{2.0}$ and
[(n—C$_6$H$_{13}$)$_2$Mg][(C$_2$H$_5$)$_3$Al]$_{0.01}$. A suitable magnesium-aluminum complex is Magala® BEM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. Nos. 3,737,393 and 4,004,071 which are incorporated herein by reference. However, any other suitable method for preparation of organometallic compounds can be suitably employed.

The oxygen-containing compounds which may be usefully employed in accordance with this invention are alcohols, aldehydes, siloxanes and ketones. Preferably the oxygen-containing compounds are selected from alcohols represented by the formulas $R^3OH$ wherein $R^3$ can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms.

Illustrative, but non-limiting examples of alcohols, which may be usefully employed in accordance with this invention are alkyl alcohols such as ethanol, 1-propanol, 2-propanol, 1-butanol, 2-butanol, t-butanol, 1-pentanol, 2-pentanol, 3-pentanol, 1-hexanol, 2-ethyl-1-hexanol, 1-octanol, 1-decanol; cycloalkyl alcohols such as cyclobutanol, cyclohexanol; aryl alcohols, such as phenol, 1-naphthol, 2-naphthol; aralkyl alcohols such as benzylalcohol, p-cresol, m-cresol; alkenyl alcohols such as allylalcohol, crotylalcohol, 3-butene-1-ol; and alkadienyl alcohols such as 2,4-hexadiene-1-ol. The most preferred alcohol is butanol.

The preferred acyl halides can be represented by the formula $R^4COX$ wherein $R^4$ is a hydrocarbyl group containing 1 to 20 carbon atoms. $R^4$ can be an alkyl group, aryl group, aralkyl group, cycloalkyl group, alkadienyl group or alkenyl group and X is a halogen. The preferred halogen is chlorine. More preferably $R^4$ is an alkyl group having 1 to 6 carbon atoms or a phenyl or alkyl phenyl group having 6 to 10 carbon atoms. Most preferably $R^4$ is a methyl or phenyl group and X is chlorine.

Illustrative, but non-limiting, examples of the acyl halides which can be usefully employed in accordance with the invention are, alkyl acyl halides such as acetylchloride, propanoylchloride, butyrylchloride, butyrylbromide, isobutyrylchloride., aryl acyl halides such as benzoylchloride, 1-naphthoylchloride, 2-naphthoylchloride; cycloalkyl acyl halides such as cyclopentane carbonylchloride, cyclohexane carbonylchloride, aralkyl acyl halides such as p-toluoylchloride, m-toluoylchloride; alkenyl acyl halides such as acryloylchloride, 6-heptenoylchloride, crotonoylchloride. Acid chlorides based on polyacids may also usefully be employed such as, for example, dodecanedioyl, succinyl chloride, camphoryl chloride, terephthaloyl chloride and the like. The preferred acid halide is benzoyl chloride.

The transition metal compounds of a Group IVb, Vb, VIb or VIII metal which can be usefully employed in the preparation of the transition metal-containing catalyst component of this invention are well known in the art. The transition metals which can be employed in accordance with this invention may be represented by the formulas $MX'_{4-q}(OR^5)_q$, $MX'_{4-q}R^5{}_q$, $VOX'_3$ and $VO(OR^5)_3$. M is a Group IVb, Vb, VIb, and VIII metal, preferably Group IVb and Vb metals and preferably titanium, vanadium or zirconium, q is 0 or a number equal to or less than 4, X' is halogen and $R^5$ is an alkyl group, aryl group or cycloalkyl group having from 1 to 20 carbon atoms and $R^5$ is an alkyl group, aryl group, aralkyl group, substituted aralkyl group, 1,3-cyclopentadienyls and the like. The aryl, aralkyls and substituted aralkyls contain from 1 to 20 carbon atoms preferably 1 to 10 carbon atoms. When the transition metal compound contains a hydrocarbyl group, $R^5$, being an alkyl, cycloalkyl, aryl, or aralkyl group, the hydrocarbyl group will preferably not contain a H atom in the position beta to the metal-carbon bond. Illustrative, but nonlimiting, limiting, examples of alkyl groups are methyl, neo-pentyl, 2,2-dimethylbutyl, 2,2-dimethylhexyl; aryl groups such as phenyl, naphthyl, aralkyl groups such as benzyl; cycloalkyl groups such as 1-norbornyl. Mixtures of the transition metal compounds can be employed if desired.

Illustrative examples of the transition metal compounds include TiCl$_4$, TiBr$_4$, Ti(OC$_2$H$_5$)$_3$Cl, Ti(OC$_2$H$_5$)Cl$_3$, Ti(OC$_4$H$_9$)$_3$Cl, Ti(OC$_3$H$_7$, )$_2$Cl$_2$, Ti(OC$_6$H$_{13}$)$_2$Cl$_2$, ti(OC$_8$H$_{17}$)$_2$Br$_2$, and Ti(OC$_{12}$H$_{25}$)Cl$_3$. TiCl$_4$is preferred.

As indicated above, mixtures of the transition metal compounds may be usefully employed, no restriction being imposed on the number of transition metal compounds which may be reacted with the organometallic composition. Any halogenide and alkoxide transition metal compound or mixtures thereof can be usefully employed. The titanium tetrahalides are especially preferred with titanium tetrachloride being most preferred.

The halogens (C) which can be suitably employed in accordance with this invention are $Cl_2$, $Br_2$, $I_2$ and mixtures thereof. Illustrative interhalogen compounds are ClF, $ClF_3$, BrF, $BrF_3$, $BrF_5$, ICl, $ICl_3$ and IBr. The preferred halogens are $Cl_2$ and Brhd 2. The preferred interhalogens contain Br or Cl. $Cl_2$ is preferred.

The transition metal-containing catalyst solid is treated with an organometallic compound of a Group IIa, IIb or IIIa metal. Preferably the organometallic compound employed in the treatment step (F) is an aluminum alkyl represented by the structural formula $R_n{}^9AlX^9{}_{3-n}$ wherein X is halogen or hydride and $R^9$ is a hydrocarbyl group selected from $C_1$ to $C_{18}$ saturated hydrocarbon radicals and $1 <= n <= 3$.

Illustrative of such compounds which can usefully be employed in the treatment step of this invention are $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$. Preferably the organoaluminum compound is an aluminum trialkyl where the alkyl groups can have from 1 to 10 carbon atoms and most preferably from 2 to 8 carbon atoms. Tri-n-hexylaluminum and tri-n-octylaluminum being most preferred.

The treatment of the support material as mentioned above is conducted in an inert solvent. The inert solvents can also be usefully employed to dissolve the individual ingredients prior to the treatment step. Preferred solvents include mineral oils and the various hydrocarbons which are liquid at reaction temperatures and in which the individual ingredients are soluble. Illustrative examples of useful solvents include the alkanes such as pentane, isopentane, hexane, heptane, octane and nonane; cycloalkanes such as cyclopentane and cyclohexane; and aromatics such as benzene, toluene, ethylbenzene and xylenes. The amount of solvent to be employed is not critical. Nevertheless, the amount should be employed so as to provide adequate heat transfer away from the catalyst components during reaction and to permit good mixing.

The organometallic component (A) employed either as the organometallic compound or its reaction product with (B) an oxygen containing compound is preferable added to the inert solid in the form of a solution. Preferred solvents for the organometallic compositions are the alkanes such as hexane, heptane, octane and the like. However, the same solvent as employed for the slurrying of the inert particulate support material can be employed for dissoving the organometallic composition. The concentration of the organometallic composition in the solvent is not critical and is limited by handling needs.

The amount of materials usefully employed in the solid catalyst component can vary over a wide range. The concentration of magnesium deposited on the essentially dry support can be in the range from about 0.1 to about 10.0 millimoles/g of support, however, greater or lesser amounts can be usefully employed. Preferably, the magnesium concentration is in the range of 0.5 to 5.0 millimoles/g of support and especially 1.0 to 2.5 millimoles/g of support. The organomagnesium to oxygen-containing compound mole ratio can range from about 0.01 to about 2.0. Preferably, the ratio is in the range 0.5 to 1.5, and more preferably in the range 0.8 to 1.2. The upper limit on this range is dependent on the choice of oxygen containing compound and the mode of addition. When the oxygen containing compound is not pre-mixed with the magnesium compound, that is, when it is added to the support before the magnesium compound or after the magnesium compound, the ratio may range from 0.01 to 2.0. When pre-mixed with the organomagnesium compound, the hydrocarbyl groups on the oxygen containing compound must be sufficiently large to ensure solubility of the reaction product, otherwise the ratio of oxygen containing compound to organomagnesium compound ranges from 0.01 to 1.0, most preferaby 0.8 to 1.0.

The amount of acyl halide employed should be such as to provide a mole ratio of about 0.1 to about 10 and most preferably 0.5 to about 2.0 with respect to the magnesium compound.

The transition metal compound is added to the inert support at a concentration of about 0.01 to about 1.5 mmoles Ti/g of dried support, preferably in the range of about 0.05 to about 1.0 mmoles Ti/g of dried support and especially in the range of about 0.1 to 0.8 mmoles Ti/g of dried support. The halogen or interhalogen treatment is such as to provide an excess of the halogen or interhalogen. Generally, the halogen employed, such as, for example, $Cl_2$, is employed in the form of a gas.

The halogen treatment of the catalyst can be accomplished, for example, by exposing the catalyst in either dry or slurry form to gaseous chlorine at 1.0 to 10 atmospheres total pressure for about 10 minutes to 4 hours at temperatures ranging from about 0° to 100° C. A mixture of $Cl_2$ and an inert gas such as argon or nitrogen can be used. The molar concentration of $Cl_2$ in the inert gas can range from about 1 mole % to 100 mole %.

The treatment of the solids with the Group IIa, IIb or IIIa metal alkyl can be accomplished, for example, by either adding the Group IIa, IIb or IIIa metal hydrocarbyl to the solid mixture or by slurrying the dried solid mixture in an inert solvent followed by the appropriate quantity of the organometallic treating agent.

The amount of treating agent (F) to be employed should be such as to provide a mole ratio of about 0.5 to about 50 and preferably 1 to about 20 with respect to titanium. Most preferably the mole ratio will be from about 1 to about 4.

Generally, the individual reaction steps can be conducted at temperatures in the range of about −50° C. to about 150° C. Preferred temperature ranges are from about −30° C. to about 60° C. with −10° C. to about 50° C. being most preferred. The reaction time for the individual treatment steps can range from about 5 minutes to about 24 hours. Preferably the reaction time will be from about ½ hour to about 8 hours. During the reaction constant agitation is desirable.

In the preparation of the transition metal-containing catalyst component drying after the completion of any step may be effected. Preferrably the silica slurry is dried after treatment with the organometallic composition and the oxygen containing compound. Washing after the completion of any step may also be effected. However, it is generally found that the material advantages of the catalyst system are diminished by washing until the completion of step (F).

The transition metal-containing catalyst component prepared in accordance with this invention are usefully employed with [the] cocatalysts well known in the art of the Ziegler catalysis for polymerization of olefins.

Typically, the cocatalysts which are used together with the transition metal-containing catalyst component are organometallic compounds of Group Ia, IIa, IIb, and IIIa metals such as aluminum alkyls, aluminum alkyl hydrides, lithium aluminum alkyls, zinc alkyls, magnesium alkyls and the like. The cocatalysts desirably used are the organoaluminum compounds. The preferred alkylaluminum compounds are represented by the formula $AlR'''_n X''_{3-n}$ wherein $1< =n< =3$ and $R'''$ is hydrogen, hydrocarbyl or substituted hydrocarbyl group and $X''$ is halogen. Preferably $R'''$ is an alkyl group having from 2 to 8 carbon atoms. Illustrative examples of the cocatalyst material are ethylaluminum dichloride, ethylaluminum sesquichloride, diethylaluminum chloride, triethylaluminum, tri-n-butylaluminum, diisobutylaluminum hydride, diethylaluminum ethoxide and the like. Aluminum trialkyl compounds are most preferred with triisobutylaluminum being highly desirable.

The catalyst system comprising the alkylaluminum cocatalyst and the transition metal-containing catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst may be usefully employed to produce high density polyethylene or linear low density polyethylene by copolymerizing ethylene with other alpha-olefins or diolefins, particularly propylene, butene-1, pentene-1, hexene-1, and octene-1. The olefins can be polymerized in the presence of the catalyst of this invention by any suitable known process such as, for example, suspension, solution and gas-phase polymerization processes.

The polymerization reaction employing catalytic amounts of the above-described catalyst can be carried out under conditions well known in the art of Ziegler polymerization, for example, in an inert diluent at a temperature in the range of 50° C. to 120° C. and a pressure of 1 and 40 atmospheres or in the gas phase at a temperature range of 70° C. to 100° C. at about 1 to about 50 atmospheres and upward. Illustrative of the gas-phase processes are those disclosed in U.S. Pat. No. 4,302,565 and U.S. Pat No. 4,302,566 which references are hereby incorporated by reference. As indicated above, one advantageous property of the catalyst system of this invention is the reduced amount of gas phase reactor fouling. The catalyst system can also be used to polymerize olefin at single phase conditions, i.e., 150° C. to 320° C. and 1000–3000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below examples and such alternatives, modifications and variations fall within the general scope of the claims.

In Examples described herein, the silica support was prepared by placing a microspheroidal silica gel in a vertical column and fluidizing with an upward flow of $N_2$. The column was heated slowly to 800° C. with a 3 hour hold at 200° C. and held at 800° C. for 3 hours after which the silica was cooled to ambient temperature. The melt index (MI) and melt index ratio (MIR) were measured in accordance with ASTM Test D1238 (condition E).

Combination of the Organomagnesium and Oxygen-Containing Compounds

To a dry, $N_2$ purged, 125 cc serum bottle containing a stir bar was charged 52.23 g (44.8 mmole Mg) of Butyl Ethyl Magala ® as supplied by Texas Alkyls. Under stirring and at room temperature an equimolar amount (4.1 cc) of 1-butanol, previously dried over molecular sieves and $N_2$ purged, was slowly added. As the alcohol was added a gelatinous mass formed which slowly dissolved to yield a water white, clear liquid. The liquid was stirred for a total of 3 hours.

PREPARATION OF CATALYSTS

The following examples illustrate the preparation of the catalysts using the intermediate drying step of this invention.

Example 1

To a dry, $N_2$ purged, 125 cc serum bottle containing a stir bar was charged 2 g of silica which has been heated to 800° C. in flowing Nitrogen, 30 cc of dried and degassed hexane, and sufficient BEM/1-butanol solution prepared in Example 1 to load 1.4 mmol Mg/g starting silica. The slurry was dried in vacuo under stirring to a free flowing solid and then reslurried with 30 cc of the hexane followed by the addition of 8.4 cc of a 0.5 mmol/cc solution of benzoyl chloride in hexane and stirring continued for an additional 0.5 hour. After 0.5 hour stirring 0.11 g $TiCl_4$ diluted with 0.75 g hexane was added. After 0.5 hour a 1 to 3 molar ratio of chlorine in nitrogen was bubbled into the slurry at a flow rate of 50 cc/min for 40 minutes followed by nitrogen for 15 minutes to flush the slurry of chlorine gas. Then a solution of tri-n-hexylaluminum in heptane was added to give a loading of 1.2 mmol Al/g starting silica. The supernatant liquid was removed and the solid was washed, decanted and dried in vacuo to yield 3.75 g of free flowing solid.

Example 2

A catalyst was prepared as in Example 1 using the steps described therein except that the aluminum loading was increased to 3.0 mmol per g of starting silica. The supernatant liquid was removed and the solid was washed, decanted and dried in vacuo to yield 3.74 g of free flowing solid.

The following examples illustrate the preparation of comparative catalysts with out the intermediate drying step of this invention.

Example 3

To a dry, N₂ purged, 125 cc serum bottle containing a stir bar was charged 2 g of silica which has been heated to 800° C. in flowing Nitrogen, 30 cc of dried and degassed hexane, and sufficient BEM/1-butanol solution prepared as above to load 1.4 mmol Mg/g starting silica. After 0.5 hour stirring 8.4 cc of a 0.5 mmol/cc solution of benzoyl chloride in hexane was added and stirring continued for an additional 0.5 hour. Then 0.11 g TiCl₄ diluted with 0.75 g hexane was added. After 0.5 hour a 1 to 3 molar ratio of chlorine in nitrogen was bubbled into the slurry at a flow rate of 50 cc/min for 40 minutes followed by nitrogen for 15 minutes to flush the slurry of chlorine gas. Then a solution of tri-n-hexylaluminum in heptane was added to give a loading of 1.2 mmol Al/g starting silica. The supernatant liquid was removed and the solid was washed, decanted and dried in vacuo to yield 3.75 g of free flowing solid.

Example 4

A catalyst was prepared as in Example 3 using the steps described therein except that the aluminum loading was increased to 3.0 mmol per g of starting silica. The supernatant liquid was removed and the solid was washed, decanted and dried in vacuo to yield 3.74 g of free flowing solid.

Polymerization

To a 1.6 liter polymerization reactor was added 850 ml of hexane, 3.6 ml of 25% (w/w) tri-isobutyl aluminum in heptane. The reaction vessel was pressured with hydrogen to 50 psig and then heated to 85° C. 20 ml of butene-1 was pressured into the reactor with sufficient ethylene to bring the total reactor pressure to 150 psig. 100 mg of the dry catalyst solids was injected into the reactor and polymerization proceeded for 60 minutes. The polymerization was terminated by shutting off the ethylene flow and rapidly cooling the reactor to room temperature. In Table I catalysts obtained employing the intermediate drying step of the present invention are compared to catalysts obtained similarly with the exception that the intermediate drying step was not used. The results show the improved melt index capability and excellent productivity of the catalysts of the present invention.

TABLE I

| Example Number | Intermediate Drying | Al/Ti (molar) | Catalyst Activity[1] | MI (g/10 min) | MIR[2] |
|---|---|---|---|---|---|
| 1 | yes | 1.2 | 3940 | 10.0 | 24.1 |
| 1 | " | 1.2 | 4512 | 11.2 | 22.7 |
| 1 | " | 1.2 | 4619 | 10.0 | — |
| Comp. 3 | no | 1.2 | 2065 | 5.6 | 25.7 |
| Comp. 3 | " | 1.2 | 2136 | 6.0 | 24.8 |
| 2 | yes | 3.0 | 3584 | 8.0 | 25.8 |
| 2 | " | 3.0 | 4370 | 10.0 | 23.3 |
| 2 | " | 3.0 | 4000 | 7.2 | 21.2 |
| Comp. 4 | no | 3.0 | 1049 | 4.2 | 24.6 |
| Comp. 4 | " | 3.0 | 911 | 3.0 | 27.6 |
| Comp. 4 | " | 3.0 | 728 | 4.8 | 28.5 |

[1] Units of Catalyst Activity are g PE/g catalyst-hr
[2] MIR is the ratio of HLMI to MI as measured by ASTM D1238 (condition E)

What is claimed is:

1. An olefin polymerization catalyst component obtained by
   A. contacting in an inert hydrocarbon solvent an inorganic metal oxide catalyst support material of a Group IIa, IIIa, IVa, or IVb metal in finely divided form with
      (a) an organometallic compound of a Group IIa, IIb, or IIIa metal and
      (b) an oxygen containing compound selected from the Group consisting of alcohols, aldehydes, siloxanes, and ketones;
   B. drying the contact product;
   C. treating the dried contact product in an inert solvent with an acyl halide, at least one transition metal compound of a Group IVb, Vb, VIb, or VIII metal, and a halogen or interhalogen, and
   D. treating with an organometallic compound of a Group IIa, IIb, or IIIa metal.

2. The catalyst component of claim 1 wherein the inorganic metal oxide is silica, the (a) organometallic compound is a dialkyl magnesium compound represented by the formula $R^1MgR^2$ wherein each of $R^1$ and $R^2$ which may be the same or different alkyl groups, aryl groups, cycloalkyl groups, aralkyl groups, alkadienyl groups or alkenyl groups having from 1-20 carbon atoms, the (b) oxygen-containing compound is an alcohol represented by the formula $R^3OH$ wherein $R^3$ can be an alkyl group, aryl group, cycloalkyl group, aralkyl group, alkadienyl group or alkenyl group having from 2-20 carbon atoms, and the oxygen-containing compound and the magnesium compound are prereacted prior to contact with the silica, the acyl halide is a $C_1$–$C_6$ alkyl or a $C_6$–$C_{10}$ aryl acyl halide, the transition metal compound is a titanium halide, the halogen or interhalogen is $Cl_2$ and the step D. organometallic compound is represented by the formula $R_n^9AlX_{3-n}$ wherein X is halogen or hydride and $R^9$ is a hydrocarbyl group selected from $C_1$ to $C_{18}$ saturated hydrocarbon radicals and $1 < = n < = 3$.

3. The catalyst component of claim 2 wherein each of $R^1$ and $R^2$ is a $C_1$–$C_6$ alkyl group, the alcohol is butanol, the acyl halide is one of benzoyl chloride or acetyl chloride, the titanium halide is TiCl₄ and the step D. organometallic compound is one of tri-n-hexylaluminum or tri-n-octylaluminum.

* * * * *